United States Patent
Saarikettu

Patent Number: 5,386,646
Date of Patent: Feb. 7, 1995

[54] ASH SILO FLUIDIZATION CLOTH

[76] Inventor: Jukka Saarikettu, Kustee Adolfinkatu 78, SF-67200 Kokkola, Finland

[21] Appl. No.: 97,294

[22] Filed: Jul. 26, 1993

Related U.S. Application Data

[63] Continuation-in-part of Ser. No. 815,498, Dec. 30, 1991, Pat. No. 5,230,226.

[30] Foreign Application Priority Data

Jun. 30, 1989 [FI] Finland .................. 893199

[51] Int. Cl.⁶ .......................... B01D 39/08; D04B 1/14
[52] U.S. Cl. .......................... 34/582; 34/586; 55/527; 66/202
[58] Field of Search .......... 66/9 R, 190, 194, 196, 66/197, 198, 200, 202; 34/582, 586

[56] References Cited

U.S. PATENT DOCUMENTS

| | | | |
|---|---|---|---|
| 3,424,220 | 1/1969 | Schuerch | 66/202 X |
| 4,143,197 | 3/1979 | Jasionowicz | 66/202 X |
| 4,433,493 | 2/1984 | Poisson | 66/202 X |
| 4,856,110 | 8/1989 | Giesick | 66/202 X |
| 5,118,569 | 6/1992 | Kuroda et al. | 66/202 X |
| 5,149,583 | 9/1992 | Saarikettu | 66/190 X |

FOREIGN PATENT DOCUMENTS 81840  8/1990  Finland.

Primary Examiner—Clifford D. Crowder
Assistant Examiner—John J. Calvert
Attorney, Agent, or Firm—C.J. Fildes & Co.

[57] ABSTRACT

A fluidization cloth for an ash silo is resistant to high temperatures and mechanical stress, and is formed of a double-sided knit made from aramid or spun glass-fibers, wherein aramid or spun glass-fibers are also used as in-lay threads and the cloth is mounted on a conically-shaped perforated surface that defines it part a foot section of the silo through which compressed air is communicated whereby the cloth permits air to pass through it and mix with the granular, powder-like substance referred to as ash in order to fluidize the ash during discharge of the ash from the silo.

10 Claims, 4 Drawing Sheets

ASH SILO FLUIDIZATION CLOTH

CROSS-REFERENCE TO RELATED APPLICATION

This invention is a continuation-in-part of U.S. patent application Ser. No. 815,498, filed Dec. 30, 1991 and issued as U.S. Pat. No. 5,230,226 on Jul. 27, 1993, which is the national phase counterpart of PCT/FI90/00167, filed Jun. 26, 1990, claiming priority of Finnish patent application Ser. No. 893,199, filed Jun. 30, 1989.

TECHNICAL FIELD

This invention relates to a fluidization cloth resistant to high temperatures and, more particularly, to a fluidization cloth for an ash silo in which the cloth is formed from a double-sided knit made from aramid fibers.

BACKGROUND ART

Often the temperature resistance of a conventional dust filter limits its application as the temperature of a process utilizing the filter exceeds the temperature range of the filter. It is possible to achieve a high temperature application by using steel net, but often these filters do not withstand corrosive substances. Nets of other metals can also be used, but these are quite expensive. Typically, the filter must also withstand abrasion and pressure impacts, which are used at regular intervals to clean it.

International Patent Application PCT/FI89/20 and corresponding U.S. Pat. No. 5,149,583 present a method of manufacturing an oriented fiber structure, in which it is most advantageous to use a double disc knitting machine, on account of its great manufacturing output. In accordance with this disclosure, two rows of needles knit loops in different directions, which form lateral channels, into which it is possible to feed or in-lay reinforcing fibers. A corresponding textile product, the structure of which is similar to that shown in this international application, is known from British application 2 121 837.

In an ash silo of a conventional power plant, a granular, powder-like substance referred to as ash is collected for subsequent discharge. Therein, a fluidization discharger includes a fluidization cloth through which compressed air is communicated whereby ash on top of the cloth behaves like a fluid and is easily communicated to a discharge opening in the silo. Conventional fluidization cloths lack heat resistivity or mechanical strength, or both. Conventional cloths with heat resistivity are warp knitted and are difficult to form into shapes coinciding with the silo structure.

DISCLOSURE OF INVENTION

An object of the present invention is to provide an improved fluidization cloth, having high temperature resistance, for an ash silo.

Another object of the present invention is to create a new type of fluidization cloth or filter for an ash silo, which withstands pressure impacts and high temperatures, as well as being highly resistant to abrasion.

Another object of the present invention is to provide an improved method of manufacturing a fluidization cloth or filter resistant to high temperatures.

In carrying out the above objects and other objects of the invention, a fluidization cloth or filter resistant to high temperatures is formed of a net-like fiber structure set in a frame. The fiber section is formed from double-side knitted poly (m-phenyleneisopthalamide) fabric, the preferred material of which is Nomex ® or other fiber resistant to high temperatures. Aromatic polyamides referred to as aramids or other corresponding reinforcing fiber is set in the channels formed by the transverse loops of the double-sided knit fabric.

Preferably, the filter can be made to conduct electricity by adding carbon fibers, which conduct electricity, to the oriented fibers. The carbon filters are therein connected to a suitable electrode at the edges of the filter. The oriented fibers can be both filament and spun fibers.

The method of manufacturing the filter includes forming a fiber net secured to a suitable frame-work. A double-sided fabric poly(m-phenyleneisopthalamide) is knitted on a knitting machine equipped with double rows of needles from a fabric that withstands high temperatures, e.g. Nomex ® fiber, and a high temperature resistant reinforcing fiber e.g. aramid fiber is fed on top of this fabric. On top of this is knitted a new double-sided fabric, wherein the reinforcing fiber remains in the channels formed by the transverse loops of the knitted structure. The double-sided fabric is then secured to the framework.

In an ash silo including an inlet section for receiving a granular, powder-like substance known as ash, a discharge section for discharging ash from the silo and a foot section located between the inlet and discharge sections, a double-sided knit fabric made from aramid or spun glass-fibers is mounted as a fluidization cloth. The double-sided knit fabric is mounted on a conically-shaped perforated surface through which compressed air is communicated in the foot section of the silo wherein ash is contiguous with the upper surface of the cloth. Air is communicated through the apertures in the perforated surface and passes through the cloth where it mixes with the ash in order to fluidize the ash during discharge of the ash from the silo.

In what follows, the invention is illustrated by means of the accompanying examples, which depict the knitted structure applied to a filter.

BEST MODE FOR CARRYING OUT THE INVENTION

Figure 1:
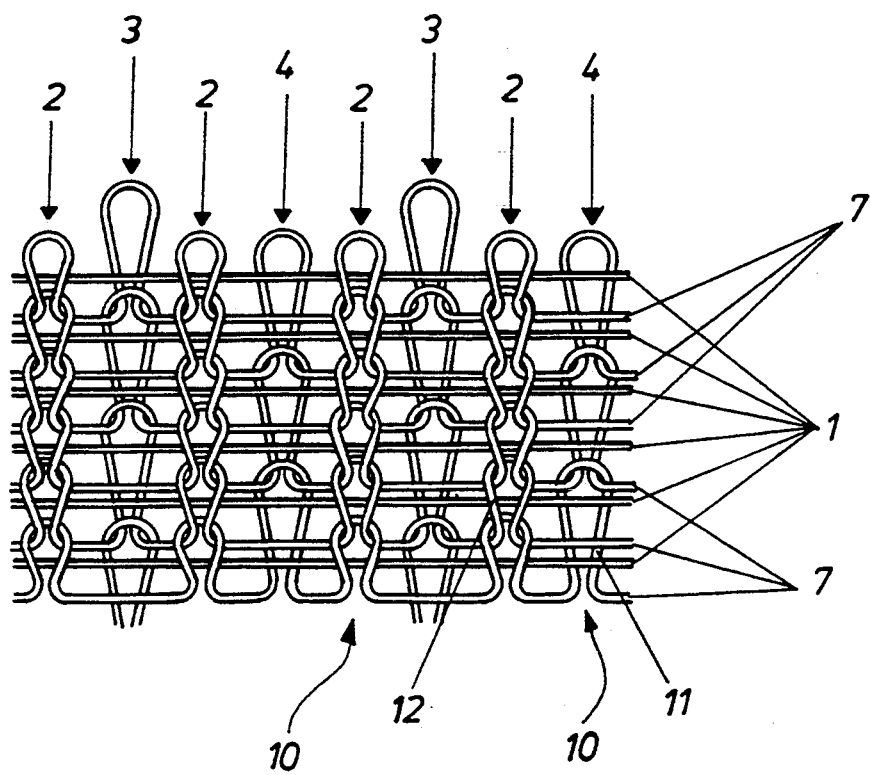
FIG. 1 is an enlarged sectional view of a filter constructed in accordance with the present invention illustrating the structure of knitted fabric.
Figure 2:
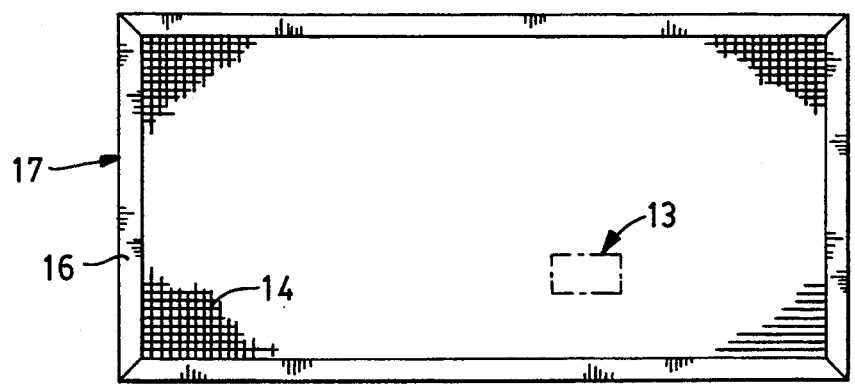
FIG. 2 is a plan view of the filter of FIG. 1 illustrating a framework securing the knitted fabric.
Figure 3:
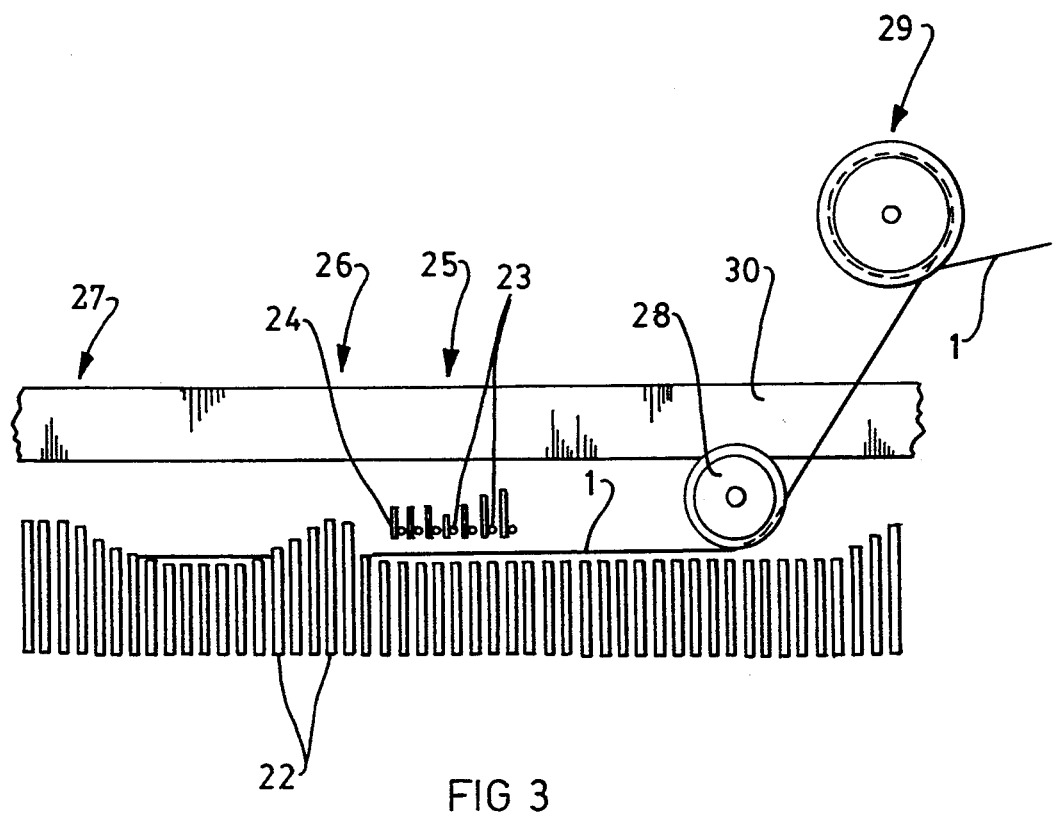
FIG. 3 is a schematic view of a circular knitting machine illustrating a dial plate.

With reference to FIGS. 1 and 2, a knitted fabric is created on a double disc or circular knitting machine shown in FIG. 3, in which there are cylinder needles in the vertical direction and disc needles in the horizontal.

Preferably, poly(m-phenyleneisopthalamide) or aromatic polyamide fibers, which withstand high temperatures, are used as the surface or support fibers 7, i.e. as a loop filament in the fabric. The needles on the cylinder side are set to knit loops 2 in each feed in different systems. The disc needles are see to the so-called interlock setting and the knitting takes place alternately in each sequential feed. The loops knitted by the disc needles are marked with the reference numbers 3 and 4.

Other aromatic polyamide reinforcing fibers, generally referred to as aramid fibers 1 are fed on every second system, and they remain in the channels formed by the loops 2, 3 and 4 running in different directions. The aramid fibers 1 remain transverse in relation to the wales 10 of the fabric. Due to the interlock setting, the fabric tends to shrink longitudinally, when the reinforcing fibers become very dense. In this way, the filter also becomes tight. Preferably, poly(m-phenyleneisopthalamide) fibers referred to as Nomex ® fibers, and sold by the DuPont Company, can also be used in place of aramid fibers as the oriented in-lay or infill reinforcing fibers.

As an example, reference can be made to two trial runs, in which the following materials and machine settings were used.

EXAMPLE 1

Surface 25 Tex Nomex ®. Infill 2×25 Tex Nomex ®, every sixth infill thread Aramide 142 Tex.

| System 1 | 2    | 3    |
|----------|------|------|
| 10       | 17   | 10   |
| B        | B    | A    |
| —        | —    | —    |
| k.c.     | pass | k.c. |
| 15       |      | 15   |

35 K.C. = knit close

EXAMPLE 2

Surface 25 Tex Nomex ®. Infill 2×25 Nomex ®, every sixth infill thread 200 Tex Carbon.

| System 1 | 2    | 3   | 4    | 5    | 6   |
|----------|------|-----|------|------|-----|
|          | 17   | 10  |      |      |     |
| pass     | A    | B   | pass | B    | A   |
| —        | —    | —   | —    | —    | —   |
| B        | pass | all | A    | pass | all |
| 15       |      | 15  |      |      |     |

In the latter example, carbon fiber, which conducts electricity, is used as a component. The carbon fibers are connected to a common electrode, in which case the filter can either be effectively grounded, or else it may be used as part of an electric filter. It is also possible to use two electrodes in such a way that some of the fibers are connected to the first electrode, and the remainder to a second electrode.

It is advantageous to use partly Aramid filament fibers and partly spun fibers as the oriented fibers. The filament fibers provide the fabric with stiffness, and the spun fibers make the filter as dense as desired, i.e. determine the size of penetrating particles. The aramid fibers also exhibit high sulphur resistivity which is desirable in many industrial filter applications.

FIG. 2 shows a filter 17, which consists of a framework 16 securing a fiber net 14. The area indicated by 13 is illustrated in FIG. 1 showing the structure of a knitted fabric.

FIG. 3 is a schematic developed view of part of circular knitting machine in the region of the dial plate 30. Needles 22 are mounted in the cylinder (not shown) of the machine beneath the dial plate 30. Associated with the cam system is a fiber guide, a roller 28 and brake device 29 keeping fiber always in even tension. Other features and the method are disclosed in the GB publication 2 121 837 which is hereby incorporated by reference.

Figure 4:
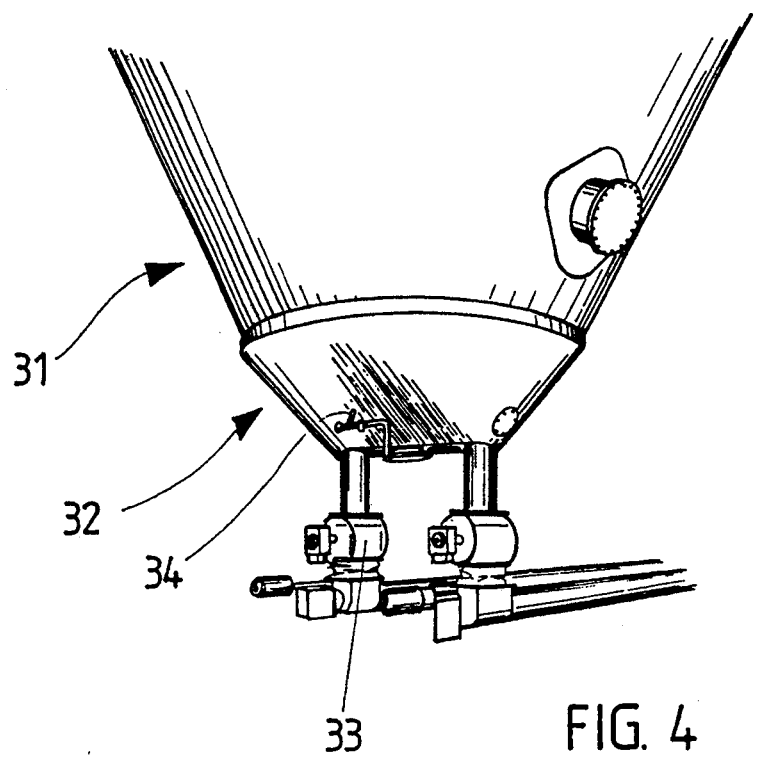
FIG. 4 is a partial perspective environmental view of an ash silo illustrating a fluidization discharger seen from outside.
Figure 5:
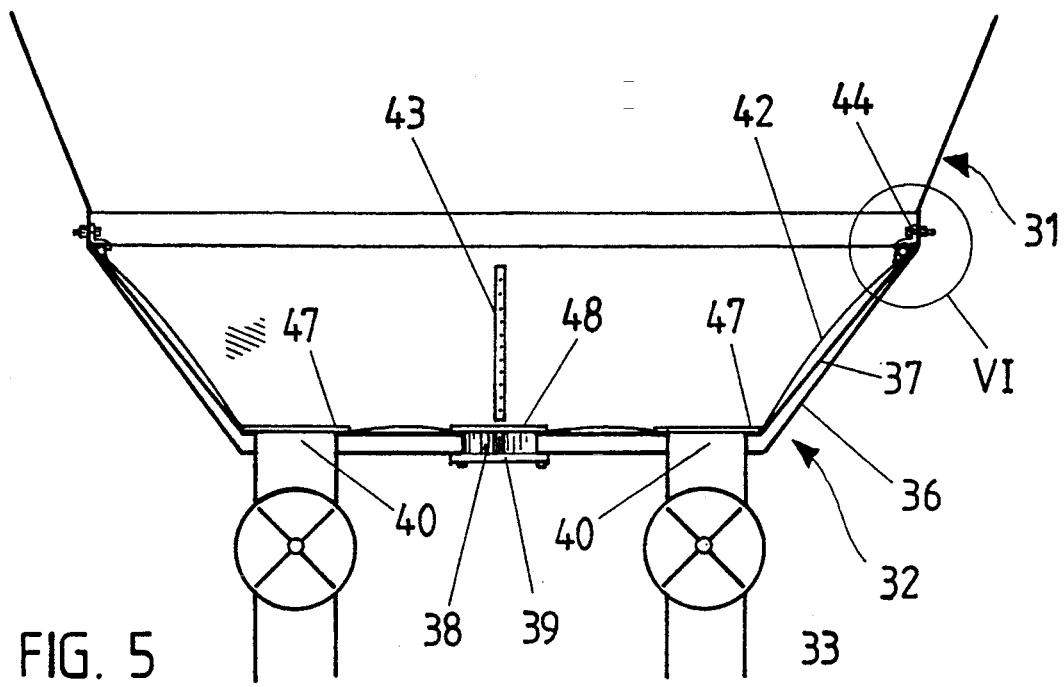
FIG. 5 is a sectional elevational view of the fluidization discharger in FIG. 4 illustrating a fluidization cloth constructed in accordance with the present invention mounted thereon.
Figure 6:
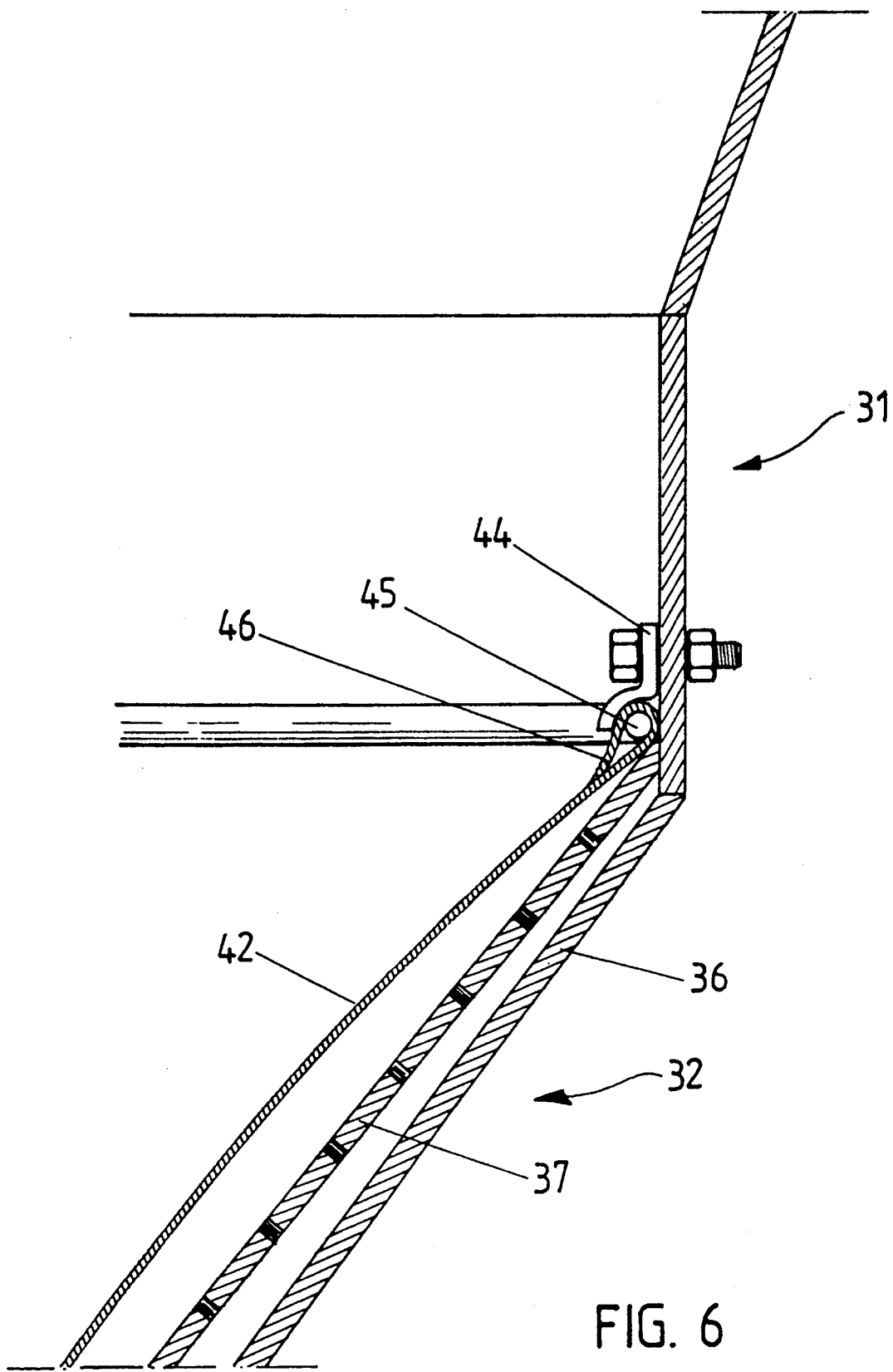
FIG. 6 is an enlarged sectional elevational view of the discharger of FIG. 5 illustrating the mounting of the fluidization cloth.

FIGS. 4–6 are related to the discharger of a power plant's ash silo, operating on the fluidization principle. Along with the ash there are glowing fragments, on account of which the components of the discharger must withstand very high temperatures. The fluidization discharger 32 is placed in a manner that is in itself known in the foot of the silo 31. In the discharger in FIG. 4 there are connections to two shut-off feeders 33, which pass the ash through them, but not compressed air, which is used as the operating power of the discharger. Compressed air is fed from two sides of the discharger. FIG. 4 shows one connection 34 of this kind. In the fluidization discharger a granular or powder-like substance is made to behave like a fluid, when it easily flows to the discharge openings.

FIG. 5 shows in detail the structure of a fluidization discharger 32. The discharger 32 is flexibly connected to the silo 31 and includes a double bottom 36, 37 and a fluidization cloth 42, output connections 40 and shut-off feeders 33 connected to them. The upper bottom 37 is perforated and compressed air pulses fed between the bottoms 36 and 37 travel through the holes to the fluidization cloth. In the middle of the bottom there is a manhole 38, which normally has an external cover 39.

The fluidization cloth 42 itself is a filter, as it must suitably pass air through it, but it must not allow ash to pass back. Air is fed through this cloth 42 into the mass to be discharged, in which case the fluidization is increased. The fluidization cloth 42 is bound to the upper part by means of a round hoop 44 and to the lower part by means of flanges 47 and 48 placed around openings 40 and 38. The fluidization cloth 42 thus remains between these flanges and the upper surface of the bottom 37. In addition on two sides the cloth 42 is bound to the bottom 37 by means of flat bars 43.

In fluidization discharge, rapid air pulses applied to the fluidization cloth create the fluidization of the powder-like solid substance and it behaves like a fluid. Thereby the substance simply flows from the openings 40 to the shut-off feeders 33. In the ash silo shown, the diameter of the hoop 44 is about 4 meters. A fluidization cloth of this size is subject to great mechanical stress in addition to high temperatures.

FIG. 6 shows in detail the upper attachment of the fluidization cloth 42. There is a turned hem 46 in the cloth 42. The round hoop 45 is threaded through hem 46. Hoop 45 cannot shrink along the conical upper bottom 37, in which case it holds the upper end of cloth 42 in place. Hoop 45 is retained from above by clips 44, which prevent it from rising.

FIG. 6 shows the perforation of the upper bottom 37 in detail.

The fluidization cloth presented here should retain 90% of its strength for 48 hours at a temperature of over 200° C. In addition to this glowing particles may appear in the ash silo. Thermal resistance of this order, together with good mechanical strength are achieved by manufacturing the fluidization cloth entirely from aramid fibers, for example as follows, using ENKA AKZO's TWARON® aramid fibers (temperature resistivity 550° C.). A double-sided knit is made on a double circular knitting machine, in which 3×102 TEX, i.e. a total of 306 TEX density aramid fiber bunches are used as in-lay thread, and 42 TEX aramid fibers are used as support fibers. The in-lay thread is of spun fiber, in which case it adheres more strongly to the knit and does not slide in the channels as would happen if filament fibers were used. Here the spun fiber makes the cloth suitably stiff, in which case the force of the pressure impact is not wasted in the excessive flexibility of the cloth.

A weight of the cloth of 700 g/m$^2$ is achieved. The air penetrability of the cloth is then sufficient. By using a 30" machine it is possible to manufacture such a wide cloth that two parts are sufficient to manufacture the fluidization cloth in this example. The total area of the fluidization cloth (upper diameter 4 m) will be about 15 m$^2$. The attachment points are reinforced with an additional layer.

It is most advantageous to use in-lay threads more than 200 TEX density, more than 30 TEX support fibers, and the square weight of the cloth should preferably exceed 300 g/m$^2$, but be less than 3000 g/m$^2$, in order that the air penetration would be sufficient.

If an even greater thermal resistance is required, the entire fluidization cloth is made from spun glass fiber, the thermal resistance of which exceeds 1100° C.

While the best mode for carrying out the invention has been described in detail, those familiar with the art to which this invention relates will recognize various alternative designs and embodiments as defined by the following claims.

What is claimed is:

1. An improved fluidization cloth for an ash silo, the cloth being resistant to high temperatures, and being attachable by upper and lower edges thereof on top of a perforated, essentially conical surface which defines in part a foot of the silo and through which the cloth may receive rapid pulses of compressed air, whereby a granular, powder-like substance on top of the cloth is made to flow to a discharge opening in the silo, the improvement comprising the cloth being formed of a double-sided knit fabric made from looped support fibers with transversely oriented in-lay threads, wherein said support fibers and said in-lay threads are formed of a material having a thermal resistance of at least 500° C.; said knit fabric being sized to support the granular powder-like substance but to permit air to pass through the fabric and mix with the granular, powder-like substance to be discharged, in order to fluidize the granular, powder-like substance during discharge.

2. The fluidization cloth of claim 1, wherein said fibers and said in-lay threads are aramid fibers.

3. The fluidization cloth of claim 2, wherein the in-lay threads have a total density of at least 200 TEX and the cloth has a square weight of at least 300 g/m$^2$.

4. The fluidization cloth of claim 3, wherein the support fibers have a density of at least 30 TEX.

5. The fluidization cloth of claim 1, wherein the support fibers have a density of at least 30 TEX.

6. The fluidization cloth of claim 1, wherein the cloth includes a turned hem at its upper edge and said hem is secured about an attachment hoop for retention in the foot of the silo.

7. The fluidization cloth of claim 1, wherein the cloth includes at its lower edge a discharge opening engagable by a flange that is adapted to surround the discharge opening and secure the cloth to the perforated surface.

8. The fluidization cloth of claim 1, wherein said support fibers and in-lay threads are spun glass fiber.

9. An improved fluidization cloth in combination with an ash silo, the ash silo including an inlet section for receiving a granular, powder-like substance known as ash, a discharge section for discharging ash from the silo and a foot section located between the inlet and discharge sections; said foot section being defined in part by a generally conically-shaped perforated surface through which compressed air is communicated, the cloth being mounted above the perforated surface, and ash being contiguous with the upper surface of the cloth, the improvement comprising the cloth being formed as a double-sided knit having in-lay threads and all made from high temperature resistant aramid fibers and wherein the cloth permits air to pass through it and mix with the ash in order to fluidize the ash during discharge of the ash from the silo.

10. An improved fluidization cloth in combination with an ash silo, the ash silo including an inlet section for receiving a granular, powder-like substance known as ash, a discharge section for discharging ash from the silo and a foot section located between the inlet and discharge sections; said foot section being defined in part by a generally conically-shaped perforated surface through which compressed air is communicated, the cloth being mounted above the perforated surface, and ash being contiguous with the upper surface of the cloth, the improvement comprising the cloth being formed as a double-sided knit having in-lay threads and all made from high temperature resistant spun glass fibers and wherein the cloth permits air to pass through it and mix with the ash in order to fluidize the ash during discharge of the ash from the silo.

* * * * *

UNITED STATES PATENT AND TRADEMARK OFFICE
CERTIFICATE OF CORRECTION

PATENT NO.   : 5,386,646
DATED        : Feb. 7, 1995
INVENTOR(S)  : Jukka Saarikettu It is certified that error appears in the above-indentified patent and that said Letters Patent is hereby corrected as shown below:

In the Abstract, line 6, change "it" to --in--.

Column 2, line 17, change "fabric" to --fiber--.

Column 3, line 6, change "see" to --set--.

Signed and Sealed this

Twenty-seventh Day of June, 1995

Attest:

BRUCE LEHMAN

Attesting Officer         Commissioner of Patents and Trademarks